United States Patent [19]
Tarnay et al.

[11] Patent Number: 5,392,081
[45] Date of Patent: Feb. 21, 1995

[54] CALCULATOR PROJECTION DISPLAY

[75] Inventors: Thomas N. Tarnay, Plano; W. Gerald Wyatt, Dallas, both of Tex.

[73] Assignee: Texas Instruments Incorporated, Dallas, Tex.

[21] Appl. No.: 129,698

[22] Filed: Sep. 29, 1993

[51] Int. Cl.6 .............................................. G03B 21/16
[52] U.S. Cl. ...................... 353/119; 353/61; 353/122
[58] Field of Search .......... 353/122, DIG. 3, DIG. 5, 353/119, 52, 60, 61; 359/83; 348/794, 748

[56] References Cited

U.S. PATENT DOCUMENTS

| | | | |
|---|---|---|---|
| 4,257,695 | 3/1981 | Langworthy | 353/61 |
| 4,904,079 | 2/1990 | Yoshimura et al. | 353/DIG. 3 |
| 5,168,294 | 12/1992 | Davis et al. | 353/122 |
| 5,255,029 | 10/1993 | Vogeley et al. | 353/122 |
| 5,260,730 | 11/1993 | Williams et al. | 353/DIG. 3 |

*Primary Examiner*—William A. Cuchlinski, Jr.
*Assistant Examiner*—William C. Dowling
*Attorney, Agent, or Firm*—William E. Hiller; Richard L. Donaldson

[57] ABSTRACT

A projection display (10) for an electronic data processing device (14) for use in conjunction with an overhead projector (12) is provided. The projection display (10) includes a display with a light transmitting screen (30), and the screen (30) is framed by a uniquely constructed housing (32). The housing (32) defines a free convection air channel below the screen (30) to conduct a cooling air flow. The air flow in the free convection air channel substantially eliminates the problem of image deterioration due to screen overheating.

9 Claims, 2 Drawing Sheets

FIG. 3
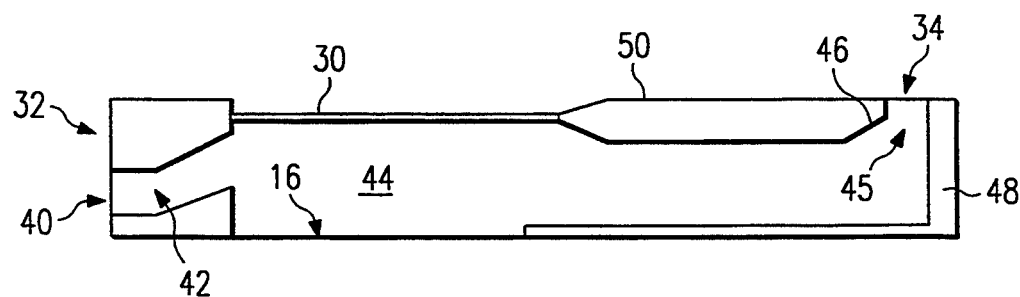
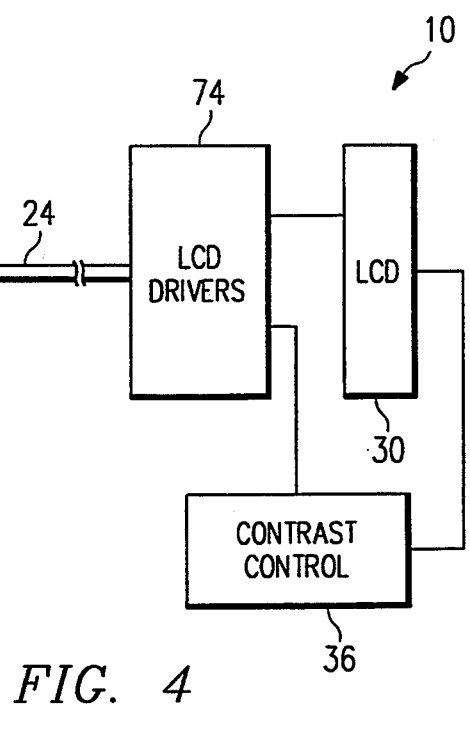
FIG. 4

CALCULATOR PROJECTION DISPLAY

NOTICE (C) Copyright, *M* Texas Instruments Incorporated, 1993. A portion of the Disclosure of this patent document contains material which may be subject to copyright protection. The copyright and mask work owner has no objection to facsimile reproduction by anyone of the patent document or the patent disclosure, as it appears in the U.S. Patent and Trademark Office, patent file or records, but otherwise reserves all rights in its copyright and mask work whatsoever.

TECHNICAL FIELD OF THE INVENTION

This invention relates in general to the field of electronic computing device displays. More particularly, the present invention relates to a calculator projection display.

BACKGROUND OF THE INVENTION

Overhead projectors have long been used by educators and lecturers to project an illuminated and enlarged image on a screen for viewing by an audience. With the increasing use of computers, powerful calculators and other electronic computing devices as pedagogical, demonstration or illustration devices, there is a need to enlarge and project the computer and/or calculator screen display for group viewing.

One attempt to achieve this capability employs a duplicate liquid crystal display (LCD) coupled to the calculator to generate the same data and configuration as displayed on the calculator display screen. This duplicate liquid crystal display is then positioned approximately ten inches above the projector document surface by the use of a stand or platform. Such a stand usually incorporates a magnifying lens positioned above the duplicate liquid crystal display to further enlarge the projected image in order to project an adequately large image.

Although such setups achieve the desired function, i.e., enlarge and project the calculator screen display, they have fatal flaws. Due to the internal projector condenser lens arrangement, the light emitting from the projector light source is more concentrated at the elevated point than at the document surface. The elevated duplicate liquid crystal display is thus subject to more concentrated energy per square inch, which translates to its substantial heating. Since typical liquid crystal displays have an operating temperature upper limit of 50° to 80° C., the elevated stand arrangement quickly causes overheating of the duplicate liquid crystal display and its associated electronics. As a result, the projected image darkens and yields progressively less contrast between the pixels on the display and the lit background. Frequent contrast adjustment or shutting off the projector therefore becomes necessary within the time span of a typical class session or lecture.

One solution to the duplicate liquid crystal display overheating and darkening problem is to use a pre-shaped heat shield placed on the projector document surface beneath the stand to decrease the amount of light energy striking the duplicate liquid crystal assembly. Because the heat shield is usually a separate piece of cardboard with no obviously discernable function, it is easily overlooked, lost or discarded by the unsuspecting user. The heat shield, although reducing the amount of heating in the liquid crystal display, is still unable to prevent overheating for a prolonged period of use. This solution is therefore unsatisfactory and merely acts as a bandage to the underlying problem.

Another solution to the duplicate liquid crystal display overheating and darkening problem is to use forced-air convection. A motorized fan is incorporated into the duplicate liquid crystal display assembly to vent air upward from the bottom surface of the duplicate liquid crystal display. However, the added fan and associated hardware not only draw additional electricity from the power source, but also they contribute added weight and bulk to the duplicate liquid crystal display assembly. Since portability is a requisite specification in the design of the calculator or computer screen projector, this solution is also undesirable.

Accordingly, a need has arisen for a remote calculator or computer screen projection display that overcomes the above-described disadvantages and problems.

SUMMARY OF THE INVENTION

In accordance with the present invention, apparatus and a method for calculator projection display are provided which substantially eliminate or reduce disadvantages and problems associated with prior circuits.

In one aspect of the present invention, a projection display for an electronic data processing device for use in conjunction with an overhead projector is provided. The projection display includes a display with a light transmitting screen, and the screen is framed by a uniquely constructed housing. The housing defines a free convection air channel below the screen, which conducts a cooling air flow to eliminate image deterioration due to screen overheating.

In another aspect of the present invention, a method of projecting an image generated by a computing device to avoid screen overheating is provided. The method includes the steps of elevating an underside surface of the light transmitting screen display slightly above an overhead projector, and forming a free convection cooling channel between the overhead projector and the underside surface of said light transmitting screen display.

BRIEF DESCRIPTION OF THE DRAWINGS

For a better understanding of the present invention, reference may be made to the accompanying drawings, in which:

FIG. 3 is a cross-sectional side view of a calculator projection display showing a free convection air channel; and FIG. 4 is a schematic block diagram of associated circuitry of a calculator projection display.

DETAILED DESCRIPTION OF THE INVENTION

Figure 1:
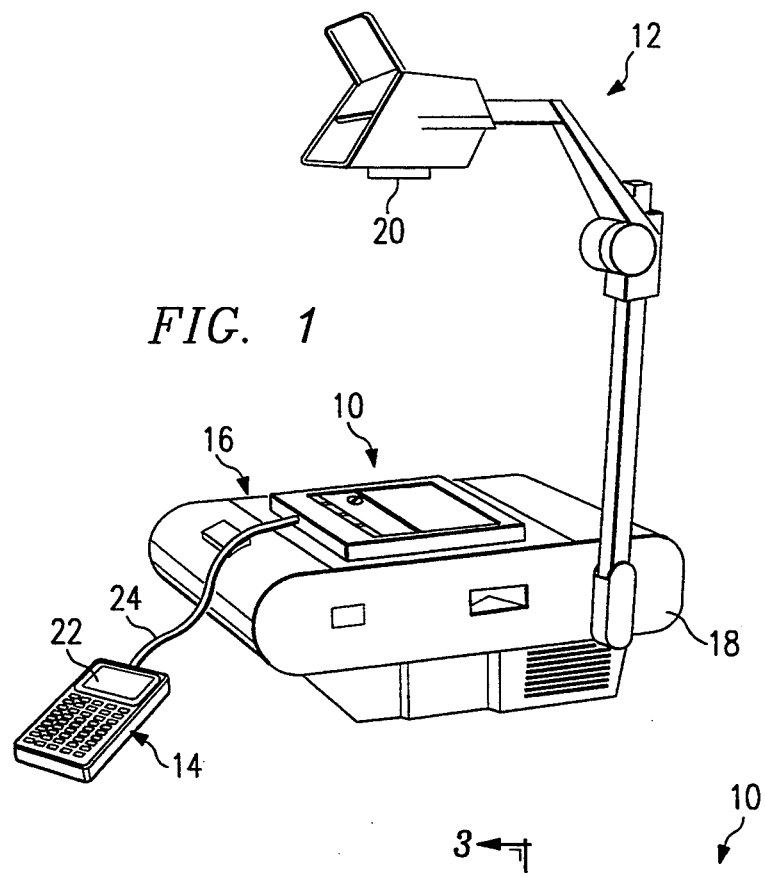
FIG. 1 is a perspective view of a calculator projection display positioned on an overhead projector and tethered to a calculator.

With reference to the drawings, FIG. 1 illustrates a calculator projection display, indicated generally at 10 and constructed according to the teaching of the present invention. In order to clearly describe the invention, like numerals are being used for like and corresponding parts in the drawing figures. In FIG. 1, calculator projection display 10 is shown positioned on an overhead projector 12 and tethered to a computing device 14. Overhead projector 12 is commonly used to enlarge and project an image placed on its document surface 16 onto a large screen (not shown). Typically, overhead projector 12 directs light from a light source (not shown) located in its base 18 upward through document surface 16 and through an overhead lens assembly 20. The light, now carrying an enlarged image, is then projected onto the screen.

Calculator projection display 10 is linked to a computing device 14, shown as a calculator in FIG. 1. Computing device 14 may also be a data processing device such as a computer (not shown) or a gaming device such as a hand-held video game. Computing device 14 has a local display screen 22 providing the user visual information resulting from computations, graph plotting, and other data manipulation processes. Calculator projection display 10 is coupled to computing device 14 by a cable 24 which may be detachable. As shown, calculator projection display 10 is positioned directly on top of the document surface 16 of overhead projector 12, and no elevation thereof is necessary to enlarge the projected image.

Figure 2:
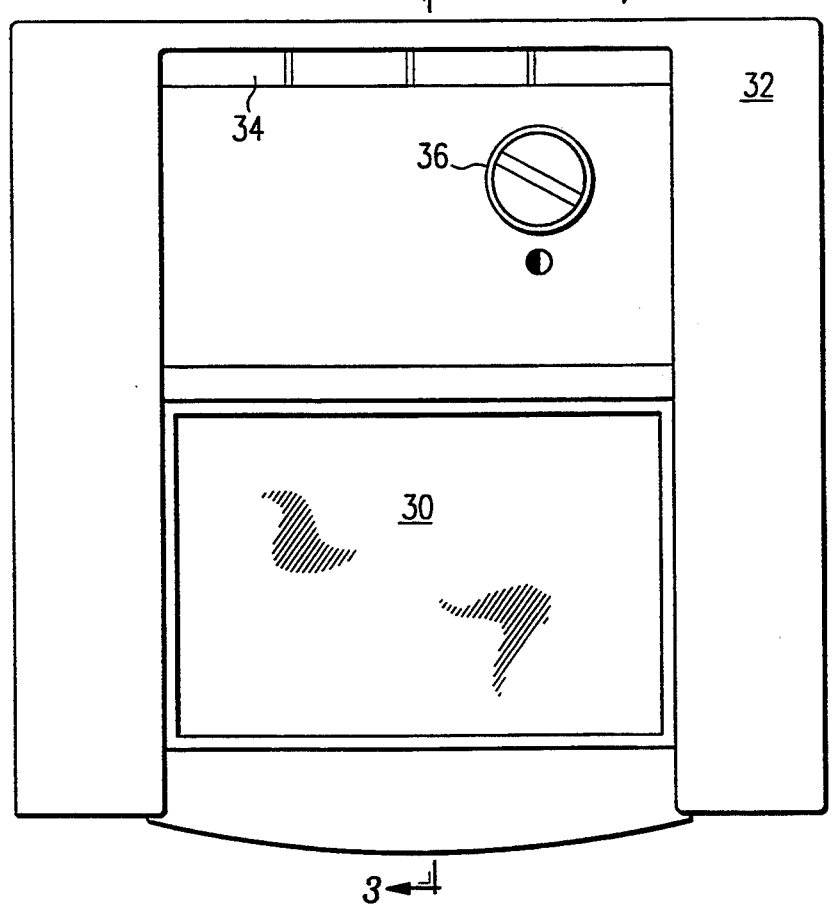
FIG. 2 is a top view of a calculator projection display.

FIG. 2 shows a more detailed illustration of calculator projection display 10. Calculator projection display 10 incorporates a light transmitting display screen 30, such as a liquid crystal display with light impeding pixels, into a uniquely structured housing 32. Display screen 30 is of a size sufficiently large so that a clear image is projected onto the screen that is adequate for a large audience. Therefore, display screen 30 of calculator projection display 10 is substantially larger than the screen display of a typical calculator. It has been shown that a display screen of approximately 188 millimeters by 128 millimeters is adequate for this purpose, as compared with a typical graphics calculator screen of approximately 71 millimeters by 51 millimeters. Display screen 30 may additionally utilize the same number but proportionally larger pixels as the calculator display screen to enhance the clarity of the resultant visual image.

Housing 32 provides a frame and support around screen display 30. It additionally houses electronics associated with screen display 30. The planar size of housing 32 is preferably selected so that it sufficiently obstructs light projected upward from base 18 of overhead projector 12. Dimensioned in this manner, the only lit image projected onto the screen is the visual information shown on screen display 30.

Housing 32 serves an even more important function. Referring also to FIG. 3, a free convection cooling channel is revealed in a simplified cross-sectional view of housing 32. Free convection cooling channel spans the entire width of display screen 30 and includes a low-lying air inlet 40 and an elevated air outlet 34. Air inlet 40 leads directly to an up ramp 42, which leads directly to an underside surface of display screen 30 and document surface 16 of overhead projector 12. The area directly under display screen 30 and a housing portion 50, which houses display screen 30 electronics, constitutes a cooling zone 44 of the free convection cooling channel. Cooling zone 44 then leads directly to a riser 46 and a chimney 45 formed by an end piece 48. As shown, chimney 45 leads to air outlet 34.

In operation, substantial heat is generated primarily due to the intense light energy from the light source in overhead projector 12 striking screen display 30. If not properly managed, the heat generated is capable of rendering screen display 30 inoperational. Liquid crystal display screens are known to darken substantially until the images are undiscernible when such overheating occurs. In calculator projection display 10, a passive heat management scheme is employed so that no such image deterioration occurs.

During initial operation, the volume of warm air in cooling zone 44 increases until it overcomes the small obstacle presented by housing portion 50 and can escape upward by way of chimney 45 and air outlet 34. Warm air does not flow out from inlet 40 since the lower density of warm air causes it to rise, and air inlet 40 is lower than air outlet 34. Once initial air movement is established in this manner by free convection, cool air is induced to continuously enter through air inlet 40. The low lying air inlet 40 and elevated outlet 34 are designed to take full advantage of the density difference between cool air and warm air to induce air flow. The cool air entering inlet 40 is directed upward toward the center of display screen 30 by the unique geometry of ramp 42, thus cooling it substantially. The air is then pushed further through cooling zone 44 by incoming cool air until it encounters riser 46 and end piece 48, which further directs the air flow upward through chimney 45 and out of air outlet 34. A steady air flow through the free convection cooling channel is thus established for adequately cooling calculator projection display 10.

As air continuously flows through the free convection cooling channel, substantial air velocity is achieved. The air exiting air outlet 34 therefore rises with such speed that it induces an horizontal air flow immediately above screen display 30 toward air outlet 34. The end result is two cooling air streams flowing above and below liquid crystal display 30 and a rising plume of hot air located above outlet 34 and housing portion 50.

It is also worthwhile to note that all surfaces expected to encounter air flow are made smooth and constructed geometrically to enhance air circulation. For example, both the top and bottom leading edges of housing portion 50 are beveled to minimize obstruction of air flow. Furthermore, ramp 42 passageway expands slightly to encourage air induction at inlet 40. It is contemplated that air induction may be further enhanced by placing a black or dark product label at the bottom horizontal surface of end piece 48. The black or dark surface would cause air in the free convection cooling channel immediately above it to heat up more quickly than at other parts of the channel. Therefore, the rising of such warm air out of outlet 34 may further promote the desired air flow. The same function may be achieved by using a dark material for the bottom surface of end piece 48.

Referring to FIG. 4, a simplified schematic block diagram of the electronics associated with calculator projection display 10 and computing device 14 is shown. As discussed above, calculator projection display 10 and computing device 14 are coupled together by a cable 24. Computing device or calculator 14 has a microprocessor 60 coupled to a memory, which may include a read-only-memory (ROM) 62 and a random access memory (RAM) 64. Computing device 14 further includes a user interface such as a keyboard or keypad 66. Microprocessor 60 is further coupled to liquid crystal display drivers and buffers 68 which are connected to the local display 22 of computing device 14. Drivers and buffers 68 may include row and column display drivers, which are not illustrated explicitly. Microprocessor 60 is further coupled to a line driver/buffer 70 which drives cable 24 that is coupled to liquid crystal display drivers 74 of calculator projection display 10. A remote liquid crystal display 30 is coupled to drivers 74. Further provided is a contrast control circuit and knob 36 for screen display 30.

In operation, microprocessor 60 preferably produces the same signals to both sets of display drivers 68 and 74. Thus, identical images are displayed on both local screen display 22 and remote screen display 30. As a teacher or lecturer uses calculator 14, he or she may view its displayed results on local screen display 22, while the audience may view the same image projected by calculator projection display 10 on a large vertical screen (not shown). The length of cable 24 should permit the speaker to freely move about a limited area in front of the audience and allow the speaker to face the audience while performing functions on computing device 14.

Constructed in this manner, calculator projection display 10 may be used for an extended period of time without noticeable deterioration of the displayed images due to overheating. Free or natural convection is employed without the weight, bulk, expense and energy consumption of forced air convection means. A unique cooling channel is provided to conduct air flow through the heated zones and to carry away warm air and replace it with cool air.

Although the present invention and its advantages have been described in detail, it should be understood that various changes, substitutions and alterations can be made therein without departing from the spirit and scope of the invention as defined by the appended claims.

What is claimed is:

1. A projection display for an electronic data processing device for use in conjunction with an overhead projector, said projection display comprising:
    a display having a light transmitting screen, said display being coupled to the electronic data processing device for receiving display data therefrom; and
    a housing for framing said display and supportively positioning said display on the overhead projector, said housing defining a free convection air channel and supporting said display in general alignment with an upper plane thereof;
    said housing further defining
        an air inlet positioned near a first edge of said display and generally at a lower plane below said upper plane,
        a cooling zone leading from said air inlet and located directly below the underside of said display,
        a generally vertical chimney leading from said cooling zone and directing the free convection air channel upward toward said upper plane, and
        an air outlet of said chimney positioned at said upper plane near a second edge of said display opposed from said first edge.

2. The projection display, as set forth in claim 1, wherein said housing further defines a ramp leading from said air inlet directing said free convection air channel upward toward an underside of said display.

3. The projection display, as set forth in claim 1, wherein said housing further defines a riser sloping upward from said cooling zone to said chimney.

4. The projection display, as set forth in claim 1, wherein said display comprises a large screen with large pixels for adequate enlarging and projection of its image.

5. The projection display, as set forth in claim 1, wherein said display includes a liquid crystal display and its associated electronic circuits.

6. The projection display, as set forth in claim 1, further comprising a contrast control circuitry.

7. A display demonstration system for use in conjunction with an overhead projector, said display demonstration system comprising:
    a liquid crystal display having a light transmitting screen and light impeding pixels for forming visual images; and
    a housing for framing said liquid crystal display and supportively positioning said display on the overhead projector, said housing defining a free convection cooling channel below said liquid crystal display and having an upper plane and a lower plane, said housing supporting said liquid crystal display in general alignment with said upper plane thereof and further defining
        an air inlet of the free convection cooling channel positioned in said lower plane of said housing below a first edge of said liquid crystal display,
        a ramp leading from said air inlet directing said free convection cooling channel upward toward an underside of said liquid crystal display,
        an air outlet of said free convection cooling channel positioned in said upper plane of said housing near a second edge of said liquid crystal display opposed from said first edge,
        a cooling zone of said free convection cooling channel directly below said liquid crystal display and between said air inlet and said air outlet,
        a riser sloping upward from said cooling zone, and
        a chimney directing said free convection air channel upward from said riser and cooling zone toward said outlet in said upper plane.

8. A method of projecting an image generated by a computing device, said method comprising the steps of:
    coupling a light transmitting screen display to the computing device and receiving display data from said computing device;
    elevating an underside surface of said light transmitting screen display above an overhead projector;
    forming a free convection cooling channel between said overhead projector and said underside surface of said light transmitting screen display;
    the forming of said free convection cooling channel including
    defining an air inlet of the free convection cooling channel positioned in a first plane below a first edge of said light transmitting screen display,
    defining an air outlet of said free convection cooling channel positioned in a second plane above said first plane near a second edge of said light transmitting screen display opposed from said first edge,
    forming a cooling zone of said free convection cooling channel directly below said underside surface of said light transmitting screen display at an elevation above said air inlet and below said air outlet, and forming a chimney directing said free convection air channel upward from said cooling zone toward said air outlet in said second plane.

9. The method, as set forth in claim 8, wherein said free convection cooling channel forming step further comprises the steps of:

defining a ramp leading from said air inlet directing said free convection cooling channel upward toward said underside surface of said light transmitting screen display; and defining a riser sloping upward from said cooling zone to said chimney.

* * * * *